United States Patent
Michaud et al.

(10) Patent No.: US 10,662,265 B2
(45) Date of Patent: May 26, 2020

(54) HYDROCARBON-BASED POLYMERS BEARING AN ALKOXYSILANE END GROUP

(71) Applicant: BOSTIK SA, La Plaine Saint Denis (FR)

(72) Inventors: Guillaume Michaud, Compiegne (FR); Frederic Simon, Pont l'Eveque (FR); Stephane Fouquay, Mont Saint-Aignan (FR); Abdou Khadri Diallo, Thorigne-Fouillard (FR); Sophie Guillaume, Vitre (FR); Jean-Francois Carpentier, Acigne (FR)

(73) Assignee: BOSTIK SA, La Plaine Saint Denis (FR)

( * ) Notice: Subject to any disclaimer, the term of this patent is extended or adjusted under 35 U.S.C. 154(b) by 572 days.

(21) Appl. No.: 14/906,737

(22) PCT Filed: Jul. 22, 2014

(86) PCT No.: PCT/FR2014/051897
§ 371 (c)(1),
(2) Date: Jan. 21, 2016

(87) PCT Pub. No.: WO2015/011405
PCT Pub. Date: Jan. 29, 2015

(65) Prior Publication Data
US 2016/0159942 A1 Jun. 9, 2016

(30) Foreign Application Priority Data
Jul. 23, 2013 (FR) ..................... 13 57241

(51) Int. Cl.
| | |
|---|---|
| *C08F 8/42* | (2006.01) |
| *C08F 2/42* | (2006.01) |
| *C08F 2/38* | (2006.01) |
| *C08G 61/08* | (2006.01) |

(52) U.S. Cl.
CPC .......... *C08F 8/42* (2013.01); *C08F 2/38* (2013.01); *C08F 2/42* (2013.01); *C08G 61/08* (2013.01); *C08G 2261/135* (2013.01); *C08G 2261/3322* (2013.01); *C08G 2261/418* (2013.01); *C08G 2261/724* (2013.01); *C08G 2261/726* (2013.01); *C08G 2261/76* (2013.01)

(58) Field of Classification Search
CPC ..... C08F 2/38; C08F 2/42; C08F 8/42; C08G 61/08; C08G 2261/135; C08G 2261/3322; C08G 2261/418; C08G 2261/724; C08G 2261/726; C08G 2261/76
See application file for complete search history.

(56) References Cited

U.S. PATENT DOCUMENTS

| | | | |
|---|---|---|---|
| 5,578,690 A | 11/1996 | Marks et al. | |
| 5,831,108 A * | 11/1998 | Grubbs | ............ B01J 31/2265 |
| | | | 556/21 |
| 6,001,909 A † | 12/1999 | Setiabudi | |
| 6,409,875 B1 | 6/2002 | Giardello et al. | |
| 2002/0153096 A1 | 10/2002 | Giardello et al. | |
| 2002/0169263 A1 † | 11/2002 | Maughon | |
| 2009/0048405 A1 | 2/2009 | Giardello et al. | |
| 2009/0187001 A1 * | 7/2009 | Pawlow | ............... C08G 61/08 |
| | | | 528/271 |

(Continued)

FOREIGN PATENT DOCUMENTS

| | | |
|---|---|---|
| CA | 2008332 A1 | 7/1991 |
| CA | 2242060 A1 † | 1/1999 |
| DE | 2344734 A1 † | 3/1975 |

(Continued)

OTHER PUBLICATIONS

Kirschvink, F. et al. Journal of Polymer Science Part A: Polymer Chemistry vol. 54 pp. 2271-2275 (Apr. 2016).*

(Continued)

*Primary Examiner* — Irina S Zemel
*Assistant Examiner* — Jeffrey S Lenihan
(74) *Attorney, Agent, or Firm* — Millen White Zelano and Branigan, PC; John Sopp

(57) ABSTRACT

Polymer of formula (1) bearing an alkoxysilane end group:

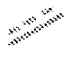

in which:

⸺ is a double or single bond;

each of $R_1$, $R_2$, $R_3$, $R_4$, $R_5$ and $R_6$ is H, a halo, an alkoxycarbonyl or an alkyl, m and p are each from 0 to 5, each of R and R' is an alkyl, Z is an alkylene, optionally interrupted with COO, q is 0 or 1, r is 0, 1 or 2, and n is such that the number-average molar mass of the polymer (1) is from 400 to 50 000 g/mol, and the polydispersity index of the polymer (1) is from 1.0 to 2.0.

Preparation by ring-opening metathesis polymerization.

Use as an adhesion promoter or a reactive plasticizer.

13 Claims, No Drawings

(56) References Cited

U.S. PATENT DOCUMENTS

| | | | |
|---|---|---|---|
| 2011/0144292 A1* | 6/2011 | Kojima | C07C 6/06 526/216 |
| 2012/0058275 A1 | 3/2012 | Giardello et al. | |

FOREIGN PATENT DOCUMENTS

| | | | |
|---|---|---|---|
| DE | 4337191 A1 † | 5/1995 | |
| EP | 0739910 A2 | 10/1996 | |
| JP | 2013075985 A | 4/2013 | |
| WO | 00/46257 A1 | 8/2000 | |
| WO | 0149628 A | 7/2001 | |

OTHER PUBLICATIONS

Brookhart, M. et al. Macromolecules vol. 25 pp. 5378-5380 (Jul. 1995).*

International Search Report dated Dec. 19, 2014 issued in corresponding PCT/FR2014/051897 application (pp. 1-2).

Search Report dated Oct. 9, 2018 issued in corresponding EP 18191182 application (6 pages).

C. Pietraszuk et al., "Metathesis of Vinyl-Substituted Silicon Compounds with Dienes and Cycloalkenes", Advanced Synthesis & Catalysis, vol. 344, No. 6-7 (Aug. 1, 2002) pp. 789-793.

English Abstract of DE 4337191 A1 published May 4, 1995.

Consolidated citation listing form opposition proceeding in corresponding EP14790156.5 dated Jun. 14, 2019 (1 page).

Pietraszuk et al., Adv. Synth. Catal. 2002, 344, No. 6+7, Metathesis of Vinyi-Substitued Silicon Compounds with Dienes and Cycloalkenes; pp. 789-793.

Anlage 1: Versuche der Einsprechenden (Vinyltrimethoxysilan, Allyltrimethoxysilan gegenOber 3-(Trimethoxysilyl)-propylacrylat.

Anlage 2: Preliminary report: Untersuchung von Nacharbeitungen des Streitpatentes (Molekulargewicht Mp, Polydispersitatsindex D, MS (Massenspektrometer)) (date unknown; author unknown) pp. 1-2.

Anlage 3: Schematische Darstellung der Reaktionsschritte (R: Gruppe des Liganden, M: Katalysator) May 28, 2019 (1 page).

Cezary Pietraszuk et al., Metathesis of Vinyl-Substituted Silicon Compounds with Dienes and Cycloalkenes, pp. 789-793, Aug. 20, 2002, Wiley-VCH Verlag GmbH & Co., Weinheim, Germany, Adv. Synth. Catal. 2002, 344.†

* cited by examiner
† cited by third party

HYDROCARBON-BASED POLYMERS BEARING AN ALKOXYSILANE END GROUP

The present invention relates to hydrocarbon-based polymers comprising an alkoxysilane end group (also known as hydrocarbon-based polymers bearing an alkoxysilane end group), and to the preparation and use thereof.

The invention also relates to the use of these hydrocarbon-based polymers as additives, for example as adhesion promoters or reactive plasticizers.

Polymers comprising two alkoxysilane end groups have been the subject of publications. Thus, patent application EP 2 468 783 from the applicant describes a polyurethane bearing polyurethane-polyether and polyurethane-polyester blocks with at least two polyurethane-polyester end blocks linked to an alkoxysilane end group. The mixing of this difunctional polymer with a crosslinking catalyst leads to the production of an adhesive composition of modified silane (MS) polymer adhesive joint type. However, no monofunctional polymer bearing an alkoxysilane end group is described.

Moreover, patent application CA 2 242 060 describes the possibility of using a composition of adhesive joint type based on polymer containing at least one cycloolefin, a catalyst for the ring-opening metathesis polymerization, a filler and a silane.

However, in practice, said document does not relate to the manufacture of polymers comprising a silane end group. Thus, the sole example describes the manufacture of a polymer by hot (60° C.) mixing over 35 minutes of a composition comprising a catalyst comprising ruthenium, a filler (wollastonite) and three constituents which are thermoplastic polynorbornene, dicyclopentadiene and vinyltrimethoxysilane (VTMS). VTMS is used as adhesion promoter and/or as drying aid. The mole ratio of VTMS to dicyclopentadiene is equal to about 1.16%. The mole ratio of the catalyst to dicyclopentadiene is about 0.08%. The polymer obtained via this synthesis is then crosslinked (cured) at high temperature (stages of 80° C. to 150° C.) for 7 hours.

Due to the cross-polymerization of the three constituents and the presence of polynorbornene, the polymer obtained from this manufacture comprises a multitude of randomly distributed silane end groups.

The aim of the present invention is to provide novel hydrocarbon-based polymers bearing an alkoxysilane end group, which may be generally used as additives, preferably as adhesion promoters or reactive plasticizers, for example in hot-melt adhesives.

Thus, the present invention relates to a hydrocarbon-based polymer bearing an alkoxysilane end group, said hydrocarbon-based polymer being of formula (1):

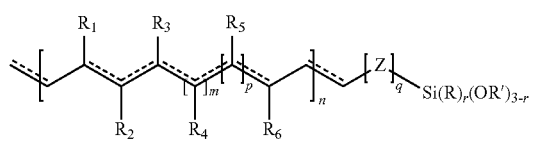
(1)

in which:

each carbon-carbon bond of the chain noted as ⋯ is a double bond or a single bond, in accordance with the valency rules of organic chemistry;

the groups $R_1$, $R_2$, $R_3$, $R_4$, $R_5$, and $R_6$ are each, independently of the other groups or otherwise, a hydrogen, a halo group, an alkoxycarbonyl group or an alkyl group, the groups $R_1$ to $R_6$ possibly being linked together as members of the same saturated or unsaturated ring or heterocycle (i.e. comprising at least one carbon-carbon double bond, including aromatic rings), m and p are integers each within a range from 0 to 5, preferably from 0 to 2, and even more preferably m and p are both equal to 1, the sum m+p itself being within a range from 0 to 10, preferably from 0 to 6, R and R', which may be identical or different, each represent a linear or branched, preferably linear, alkyl group comprising from 1 to 4 and preferably from 1 to 2 carbon atoms, Z is a divalent group chosen from alkylene groups, optionally interrupted with an ester function, and comprising from 1 to 22 and preferably from 1 to 6 carbon atoms, q is an integer equal to 0 or 1, r is an integer equal to 0, 1 or 2, and n is an integer such that the number-average molar mass Mn of the hydrocarbon-based polymer of formula (1) is within a range from 400 to 50 000 g/mol, preferably from 600 to 20 000 g/mol, and the polydispersity index (PDI) of the hydrocarbon-based polymer of formula (1) is within a range from 1.0 to 2.0 and preferably from 1.25 to 1.55.

When m=0, this means that there are no groups between the square brackets to which m applies and that the two carbon-carbon bonds each overlapping one of the square brackets constitute the same carbon-carbon bond. When p=0, this means that there are no groups between the square brackets to which p applies and that the two carbon-carbon bonds each overlapping one of the square brackets constitute the same carbon-carbon bond. When q=0, this means that there are no groups between the square brackets to which q applies and that the two carbon-carbon bonds each overlapping one of the square brackets constitute the same carbon-carbon bond.

Obviously, all the formulae given here are in accordance with the valency rules of organic chemistry.

According to the invention, the term "alkyl group" means a linear or branched, cyclic, acyclic, heterocyclic or polycyclic hydrocarbon-based compound, generally comprising from 1 to 22 and preferably from 1 to 4 carbon atoms. Such an alkyl group generally comprises from 1 to 4 and preferably from 1 to 2 carbon atoms.

According to the invention, the term "halo group" means an iodo, chloro, bromo or fluoro group, preferably chloro.

According to the invention, the term "heterocycle" means a ring which may comprise an atom other than carbon in the chain of the ring, for instance oxygen.

According to the invention, the term "alkylene group interrupted with an ester function" means a linear or branched, saturated or partially unsaturated alkylene (divalent) group, comprising from 1 to 22 and preferably from 1 to 6 carbon atoms, such that a chain of carbon atoms that it comprises may also comprise a divalent —COO— group.

According to the invention, the term "alkoxycarbonyl group" means a linear or branched, saturated or partially unsaturated alkyl (monovalent) group, comprising from 1 to 22 and preferably from 1 to 6 carbon atoms, such that a chain of carbon atoms that it comprises may also comprise a divalent —COO— group.

According to the invention, the term "alkoxysilane group" means a linear or branched, saturated or partially unsaturated alkyl (monovalent) group, comprising from 1 to 4 and preferably from 1 to 2 carbon atoms, such that a chain of carbon atoms that it comprises may also comprise a divalent —Si—O— group.

Preferably, the group of formula —[Z]$_q$—Si(R)$_r$(OR')$_{3-r}$, is chosen from:
- —Si(OCH$_3$)$_3$ (in the case where q=0, r=0 and R' is CH$_3$);
- —SiCH$_3$(OCH$_3$)$_2$ (in the case where q=0, r=1, R is CH$_3$ and R' is CH$_3$);
- —CH$_2$Si(OCH$_3$)$_3$ (in the case where q=1, Z is CH$_2$, r=0 and R' is CH$_3$);
- —CH$_2$SiCH$_3$(OCH$_3$)$_2$ (in the case where q=1, Z is CH$_2$, r=1, R is CH$_3$ and R' is CH$_3$);
- —CO—O—(CH$_2$)$_3$Si(OCH$_3$)$_3$ (in the case where q=1, Z is CO—O—(CH$_2$)$_3$, r=0 and R' is CH$_3$); and
- —CO—O—(CH$_2$)$_3$SiCH$_3$(OCH$_3$)$_2$ (in the case where q=1, Z is CO—O—(CH$_2$)$_3$, r=1, R is CH$_3$ and R' is CH$_3$).

The polydispersity index PDI (or dispersity Đ$_M$) is defined as the ratio Mw/Mn, i.e. the ratio of the weight-average molar mass to the number-average molar mass of the polymer.

The two average molar masses Mn and Mw are measured according to the invention by size exclusion chromatography (SEC), usually with PEG (polyethylene glycol) or PS (polystyrene) calibration, preferably PS calibration.

The term "end group" means a group located at the chain end (or extremity) of the polymer.

If it is unsaturated, the polymer according to the invention usually comprises a plurality of (i.e. more than two) carbon-carbon double bonds.

In a preferred embodiment, the polymer of formula (1) comprises only one carbon-carbon double bond per repeating unit [ . . . ]$_n$, and the polymer is of formula (1'):

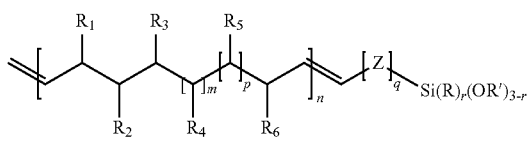

(1')

In this case, preferably, m and p are equal to 1.

Preferably, the invention relates to a hydrocarbon-based polymer bearing an alkoxysilane end group, said hydrocarbon-based polymer being of formula (2) or of formula (3):

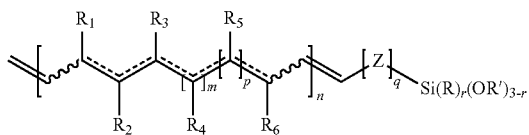

(2)

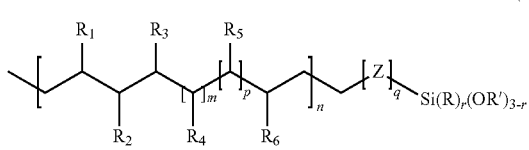

(3)

in which ⁓, m, p, q, r, n, Z, R$_1$, R$_2$, R$_3$, R$_4$, R$_5$ and R$_6$ have the meanings given above.

As is known to those skilled in the art, the bond ⁓ means that the bond is geometrically oriented on one side or the other relative to the double bond (cis (Z) or trans (E)).

Particularly preferably, m is equal to 1 and p is equal to 1. In this case, preferably, q is equal to 0.

Formula (2) illustrates the case in which the repeating unit of the main chain of the polymer of formula (1) is unsaturated and comprises at least one carbon-carbon double bond. In a preferred embodiment, the polymer of formula (2) comprises only one carbon-carbon double bond per repeating unit [ . . . ]$_n$, and the polymer is of formula (2').

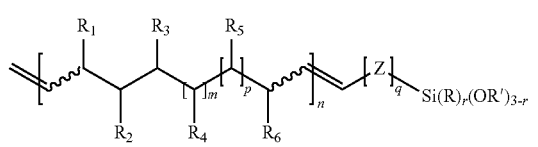

(2')

In this case, preferably, m and p are equal to 1.

Formula (3) illustrates the case in which the main chain of the polymer of formula (1) is saturated.

The polymer of formula (3) may be derived, for example, from the hydrogenation of the polymer of formula (2).

The polymer of formula (2) is generally of trans (E)-trans (E), trans (E)-cis (Z) or cis (Z)-cis (Z) orientation. The three isomers are generally obtained in variable proportions, usually with a majority of trans (E)-trans (E). It is possible according to the invention to obtain virtually predominantly the trans (E)-trans (E) isomer.

According to a preferred embodiment of the invention, the invention relates to a hydrocarbon-based polymer bearing an alkoxysilane end group, said hydrocarbon-based polymer being of formula (4):

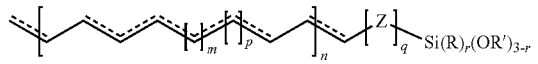

(4)

in which ⁓, m, p, q, r, n, Z, R and R' have the meanings given above.

Preferably, the group of formula —[Z]$_q$—Si(R)$_r$(OR')$_{3-r}$, is chosen from —Si(OCH$_3$)$_3$; —SiCH$_3$(OCH$_3$)$_2$; —CH$_2$Si(OCH$_3$)$_3$; —CH$_2$SiCH$_3$(OCH$_3$)$_2$; —CO—O—(CH$_2$)$_3$Si(OCH$_3$)$_3$; and —CO—O—(CH$_2$)$_3$SiCH$_3$(OCH$_3$)$_2$).

Formula (4) illustrates the case in which the polymer of formula (1) is such that R$_1$, R$_2$, R$_3$, R$_4$, R$_5$, and R$_6$ are each a hydrogen (H). In a preferred embodiment, the polymer of formula (4) comprises at most only one carbon-carbon double bond per repeating unit [ . . . ]$_n$, and the polymer is of formula (4').

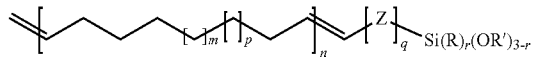

(4')

In this case, preferably, m and p are equal to 1.

Preferably, the group of formula —[Z]$_q$—Si(R)$_r$(OR')$_{3-r}$ is chosen from —Si(OCH$_3$)$_3$; —SiCH$_3$(OCH$_3$)$_2$; —CH$_2$Si(OCH$_3$)$_3$; —CH$_2$SiCH$_3$(OCH$_3$)$_2$; —CO—O—(CH$_2$)$_3$Si(OCH$_3$)$_3$; and —CO—O—(CH$_2$)$_3$SiCH$_3$(OCH$_3$)$_2$).

According to this embodiment, preferably, the invention relates to a hydrocarbon-based polymer bearing an alkoxysilane end group, said hydrocarbon-based polymer being of formula (5) or of formula (6):

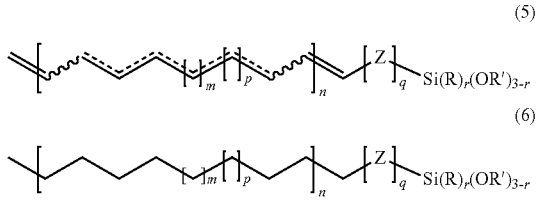

in which 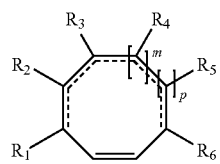, m, p, q, r, n, Z, R and R' have the meanings given above.

Formula (5) illustrates the case in which the repeating unit of the main chain of the polymer of formula (4) is unsaturated and comprises at least one carbon-carbon double bond.

In a preferred embodiment, the polymer of formula (5) comprises only one carbon-carbon double bond per repeating unit [ . . . ]$_n$, and the polymer is of formula (5'). In this case, preferably, m and p are equal to 1.

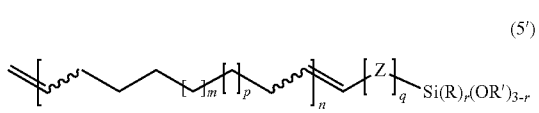

Formula (6) illustrates the case in which the main chain of the polymer of formula (4) is saturated.

The polymer of formula (6) may be derived, for example, from the hydrogenation of the polymer of formula (5).

Formulae (5) and (6) correspond to formulae (2) and (3) in which R$_1$, R$_2$, R$_3$, R$_4$, R$_5$, and R$_6$ are each a hydrogen (H).

Preferably, for each of these two formulae (5) and (6), the group of formula —[Z]$_q$—Si(R)$_r$(OR')$_{3-r}$ is chosen from —Si(OCH$_3$)$_3$; —SiCH$_3$(OCH$_3$)$_2$; —CH$_2$Si(OCH$_3$)$_3$; —CH$_2$SiCH$_3$(OCH$_3$)$_2$; —CO—O—(CH$_2$)$_3$Si(OCH$_3$)$_3$; and —CO—O—(CH$_2$)$_3$SiCH$_3$(OCH$_3$)$_2$).

The invention also relates to a process for preparing at least one hydrocarbon-based polymer bearing an alkoxysilane end group according to the invention, said process comprising at least one step of ring-opening metathesis polymerization, in the presence of:
- at least one metathesis catalyst, preferably a catalyst comprising ruthenium, even more preferably a Grubbs catalyst,
- at least one chain-transfer agent (CTA) chosen from the group formed by alkenylsilanes bearing a monosubstituted carbon-carbon double bond, preferably from the group formed by vinyltrimethoxysilane, allyltrimethoxysilane and 3-(trimethoxysilyl)propyl acrylate, and
- at least one compound chosen from compounds comprising at least one hydrocarbon-based ring and generally from 6 to 16 and preferably from 6 to 12 carbon atoms per ring, said ring comprising at least one carbon-carbon double bond, and substituted derivatives of this compound, said compound generally being of formula (7):

$$R_3 \quad R_4 \atop R_2 \diagup\diagdown R_5 \atop R_1 \diagdown\diagup R_6 \qquad (7)$$

in which m, p, R$_1$, R$_2$, R$_3$, R$_4$, R$_5$, and R$_6$ have the meanings given above, said step being performed for a time of less than 2 hours (i.e. from 0 to 2 hours, limits exclusive), preferably less than 30 minutes, when R$_1$ and R$_6$ are both equal to H; and said step being performed for a time of less than or equal to 30 hours when at least one from among R$_1$ and R$_6$ is not H.

According to the invention, the term "when at least one from among R$_1$ and R$_6$ is not H" means that R$_1$ is not H or that R$_6$ is not H or that both R$_1$ and R$_6$ are not H.

When R$_1$ and R$_6$ are both equal to H, the reaction time is preferably from 1 to 30 minutes, even more preferably from 2 to 20 minutes, for example from 5 to 10 minutes (limits inclusive).

The mole ratio of the CTA to the compound comprising at least one hydrocarbon-based ring is generally within a range from 1 to 10 mol % and preferably from 5 to 10 mol %.

According to the invention, the term "alkenylsilane comprising a carbon-carbon double bond" means a compound of formula H$_2$C═CH—(CH$_2$)$_z$Si(R$^1$)$_t$(R$^2$)$_u$(OR$^3$)$_{3-t-u}$ in which z is from 0 to 10 and R$^1$, R$^2$ and R$^3$ are, independently of each other, a saturated, linear or branched alkyl group comprising from 1 to 4 and preferably from 1 to 2 carbon atoms and t=0, 1 or 2, and u=0, 1 or 2, with t+u<3.

In general, the compounds are chosen from compounds comprising at least one hydrocarbon-based ring and generally from 6 to 16 and preferably from 6 to 12 carbon atoms per ring, said ring comprising at least one carbon-carbon double bond. The ring chain is preferably formed from carbon atoms, but at least one carbon atom may be replaced with another atom such as oxygen. The substituted derivatives of these compounds comprise derivatives comprising at least a second ring comprising at least one carbon-carbon bond in common with the first ring.

The compounds of formula (7) are substituted or unsubstituted. According to the invention, the term "substitution" means the presence of a group, generally replacing a hydrogen, the substitution being of alkyl, cyclic or acyclic, alkoxycarbonyl or halo type, and the substitution preferably being located alpha, beta, gamma or delta to the carbon-carbon double bond, even more preferably gamma or delta to the carbon-carbon double bond.

In a preferred embodiment of the invention, these compounds are not substituted, i.e. R$_1$═R$_2$═R$_3$═R$_4$═R$_5$═R$_6$═H.

In a preferred embodiment of the invention, which may or may not be independent of the preceding embodiment, m=p=1.

In a preferred embodiment of the invention, which may or may not be independent of the preceding embodiments, the chain-transfer agent has the formula CH$_2$═CH—[Z]$_q$—Si(R)$_r$(OR')$_{3-r}$, in which Z, R, R', q and r have the meanings given above.

Preferably, the chain-transfer agent is chosen from: $CH_2$=CH—Si$(OCH_3)_3$; $CH_2$=CH—SiCH$_3$$(OCH_3)_2$; $CH_2$=CH—CH$_2$Si$(OCH_3)_3$; $CH_2$=CH—CH$_2$SiCH$_3$$(OCH_3)_2$; $CH_2$=CH—CO—O—$(CH_2)_3$Si$(OCH_3)_3$; and $CH_2$=CH—CO—O—$(CH_2)_3$SiCH$_3$$(OCH_3)_2$.

Ring-opening metathesis polymerization is a reaction that is well known to those skilled in the art, which is performed here in the presence of vinyltrimethoxysilane, allyltrimethoxysilane or 3-(trimethoxysilyl)propyl acrylate.

Vinyltrimethoxysilane (or (trimethoxysilyl)ethylene or ethenyltrimethoxysilane) (product of CAS No. 2768-02-7), allyltrimethoxysilane (product of CAS No. 2551-83-9) and 3-(trimethoxysilyl)propyl acrylate (product of CAS No. 4369-14-6) are commercially available products.

In general, the cyclic compounds of formula (7) comprise at least one ring comprising from 6 to 16 chain atoms and at least one carbon-carbon double bond. The ring chain is preferably formed from carbon atoms, but at least one carbon atom may be replaced with another atom such as oxygen.

The cyclic compounds of formula (7) are preferably chosen according to the invention from the group formed by cycloheptene, cyclooctene, cyclononene, cyclodecene, cycloundecene, cyclododecene, 1,5-cyclooctadiene, cyclononadiene, 1,5,9-cyclodecatriene, and also norbornene, norbornadiene, dicyclopentadiene, 7-oxanorbornene and 7-oxanorbornadiene, having the respective formulae:

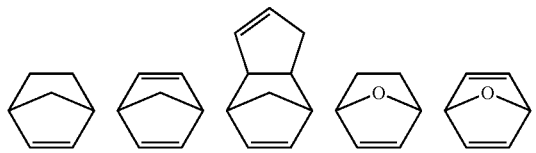

Cyclooctene (COE) and 1,5-cyclooctadiene (COD) are most particularly preferred.

Mention may also be made of monosubstituted or polysubstituted derivatives of these cyclic compounds, such as, preferably, alkyl-cyclooctenes, alkyl-cyclooctadienes, halocycloalkenes and alkylcarbonylcycloalkenes. In such a case, the alkyl, halo and alkoxycarbonyl groups have the meanings given above. The alkyl groups are usually alpha, beta, gamma or delta to the carbon-carbon double bond and even more preferably gamma or delta to the carbon-carbon double bond.

Ring-opening metathesis polymerization is usually performed in the presence of at least one solvent, generally chosen from the group formed by the aqueous, organic or protic solvents typically used in polymerization reactions and which are inert under the polymerization conditions, such as aromatic hydrocarbons, chlorohydrocarbons, ethers, aliphatic hydrocarbons, alcohols and water, or mixtures thereof. A preferred solvent is chosen from the group formed by benzene, toluene, para-xylene, methylene chloride, dichloroethane, dichlorobenzene, chlorobenzene, tetrahydrofuran, diethyl ether, pentane, hexane, heptane, methanol, ethanol and water, or mixtures thereof. Even more preferably, the solvent is chosen from the group formed by benzene, toluene, para-xylene, methylene chloride, dichloroethane, dichlorobenzene, chlorobenzene, tetrahydrofuran, diethyl ether, pentane, hexane, heptane, methanol, ethanol, or mixtures thereof. Even more particularly preferably, the solvent is toluene, hexane, heptane, or a mixture of toluene and methylene chloride. The solubility of the polymer formed during the polymerization reaction generally and mainly depends on the choice of the solvent and on the molar weight of the polymer obtained. It is also possible for the reaction to be performed without solvent.

The metathesis catalyst, for instance a Grubbs catalyst, is generally a commercial product.

The metathesis catalyst is usually a transition metal catalyst, especially among which is a catalyst comprising ruthenium, usually in the form of ruthenium complexes such as ruthenium carbene. Use may thus be made particularly preferably of Grubbs catalysts. According to the invention, the term "Grubbs catalyst" generally means a first or second generation Grubbs catalyst, but also any other catalyst of Grubbs type (comprising ruthenium-carbene) that is available to a person skilled in the art, for instance the substituted Grubbs catalysts described in U.S. Pat. No. 5,849,851.

A first-generation Grubbs catalyst is generally of formula (8):

in which Ph is phenyl and Cy is cyclohexyl.

The group P(Cy)$_3$ is a tricyclohexylphosphine group.

The IUPAC name of this compound is: benzylidenebis(tricyclohexylphosphine)dichlororuthenium (of CAS No. 172222-30-9).

A second-generation Grubbs catalyst is generally of formula (9):

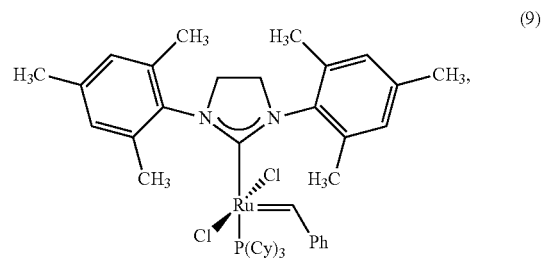

in which Ph is phenyl and Cy is cyclohexyl.

The IUPAC name of this second-generation catalyst is benzylidene[1,3-bis(2,4,6-trimethylphenyl)-2-imidazolidinylidene]-dichloro(tricyclohexylphosphine)ruthenium (of CAS No. 246047-72-3).

The preparation process according to the invention may also comprise at least one additional step of hydrogenation of double bonds. Obviously, this step is performed only if the hydrocarbon-based polymer of formula (1) according to the invention is unsaturated, i.e. if it is in particular a polymer of formula (2), (2'), (5) or (5'). Hydrogenation of at least one double bond and preferably total or partial hydrogenation of the double bonds is thus performed.

This step is generally performed by catalytic hydrogenation, usually under hydrogen pressure and in the presence of a hydrogenation catalyst such as a palladium catalyst supported on charcoal (Pd/C). It more particularly allows the formation of a compound of formula (3) (or, respectively, (6)) from a compound of formula (2) or (2') (or, respectively, (5) or (5')).

Advantageously, the novel hydrocarbon-based polymer according to the invention may be used as an additive, usually:
- as an adhesion promoter, or
- as a reactive plasticizer in adhesive compositions.

The hydrocarbon-based polymer according to the invention may thus be used, for example, as an adhesion promoter in an adhesive composition of HMA (hot-melt adhesive) or HMPSA (hot-melt pressure-sensitive adhesive) type based on polyolefins or block polymers comprising styrene.

The hydrocarbon-based polymer according to the invention may be used, for example, as a reactive plasticizer in silylated adhesive compositions.

Specifically, the alkoxysilane end group of the unsaturated or saturated hydrocarbon-based polymers according to the invention advantageously constitutes a polar head located close to the apolar and lipophilic polymer chain. Consequently, the addition of at least one unsaturated or saturated hydrocarbon-based polymer according to the invention makes it possible to decrease the interface tension of adhesive compositions.

The invention thus also relates to the use of at least one hydrocarbon-based polymer according to the invention as an adhesion promoter.

The invention thus also relates to the use of at least one hydrocarbon-based polymer according to the invention as a reactive plasticizer in an adhesive composition.

The invention will be understood more clearly in the light of the examples that follow.

EXAMPLES

The examples that follow illustrate the invention without, however, limiting its scope.

The synthetic reactions of the examples were performed in a single step of ring-opening polymerization of cyclooctene in the presence of a Grubbs catalyst and a transfer agent.

The general reaction scheme (scheme No. 1) of the polymerizations of Examples 1 to 3 is given below, and will be explained on a case by case basis in these Examples 1 to 3.

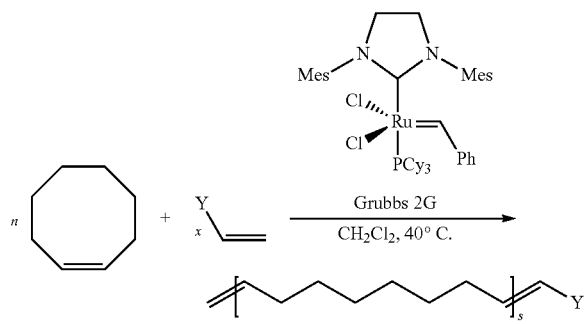

Herein, CTA is the chain-transfer agent, COE is cyclooctene, 2G Grubbs is the catalyst of formula (9) and Y (equal to —[Z]$_q$—Si(R)$_r$(OR')$_{3-r}$) is chosen from —Si(OCH$_3$)$_3$ (in the case where the CTA is vinyltrimethoxysilane), —CH$_2$Si(OCH$_3$)$_3$ (in the case where the CTA is allyltrimethoxysilane) and —CO—O—(CH$_2$)$_3$Si(OCH$_3$)$_3$ (in the case where the CTA is 3-(trimethoxysilyl)propyl acrylate); x is the number of moles of CTA; n is the number of moles of COE, and s is the repetition number of the monomer unit in the polymer.

In any event, "s" is a number less than or equal to "n", preferably equal to n.

The reaction could last up to 2 hours.

Experimental Protocol

All the experiments were performed, if necessary, under an argon atmosphere.

All the reagents (cyclooctene (COE), 3-hexylcyclooctene (3-H-COE), the second-generation Grubbs (or 2G Grubbs) catalyst of formula (9), vinyltrimethoxysilane, allyltrimethoxysilane and 3-(trimethoxysilyl)propyl acrylate) were products from the company Sigma-Aldrich.

Cyclooctene (COE) and 3-hexylcyclooctene (3-H—COE) were degassed a first time, then dried over CaH$_2$ and finally distilled before use.

All the other products were used as received.

The NMR spectra were recorded on Brüker AM-500 and Brüker AM-400 spectrometers, at 298 K in CDCl$_3$. The chemical shifts were referenced relative to tetramethylsilane (TMS) using the proton ($^1$H) or carbon ($^{13}$C) resonance of the deuterated solvent. The chemical shift of $^{29}$Si was referenced relative to TMS.

The number-average and weight-average molar masses ($M_n$ and $M_w$) and the polydispersity index PDI ($M_w/M_n$) of the polymers were determined by size exclusion chromatography (SEC), with polystyrene calibration, using a Polymer Laboratories PL-GPC 50 instrument. The samples were eluted with tetrahydrofuran (THF) (product from the company Sigma-Aldrich) at 30° C. and at 1.0 mL/min. The mass spectra were recorded with an AutoFlex LT high-resolution spectrometer (Brüker) equipped with an N$_2$ pulsed laser source (337 nm, 4 ns pulse width).

General Polymerization Procedure of Examples 1 to 3

All the polymerizations were performed in a similar manner. The only differences concerned the nature and the initial concentration of the chain-transfer agent (CTA).

A typical procedure here is described below.

The monomer COE (1 mmol) and dry CH$_2$Cl$_2$ (7 mL) were placed in a 20 mL three-necked flask into which was also placed a Teflon®-coated magnetic stirring bar. The flask and its contents were then placed under argon. CTA (0.1 mmol), was then introduced into the flask by syringe. The flask was immersed in an oil bath at 40° C. immediately after the addition, via a cannula, of the G2 catalyst (5 µmol) dissolved in CH$_2$Cl$_2$. After 5 (or 10) minutes, counting from the addition of the catalyst, the product present in the flask was extracted after concentrating the solvent under vacuum. A product was then recovered after precipitation from methanol (which made it possible to recover the catalyst), filtration and drying under vacuum. The analysis made it possible to demonstrate that the product was indeed a polymer having the expected formula.

All the polymers prepared in the examples were recovered as colorless solid powders, readily soluble in chloroform and insoluble in methanol.

Example 1: Synthesis of a Polymer Comprising an Alkoxysilane End Group Starting With Cyclooctene (COE) and Vinyltrimethoxysilane The reaction was performed according to the general reaction scheme No. 1 given previously, with Y=—Si(OCH$_3$)$_3$.

The expected polymer was synthesized. It had a melting point of 57° C.

Various tests were performed according to this reaction. They are collated in Table 1 below.

TABLE 1

| Test No.[a] | [COE]$_0$/[CTA]$_0$/[Ru]$_0$ (mol/mol) | Conversion (%) | Mn$_{SEC}$[b] (g/mol) | PDI |
|---|---|---|---|---|
| 1 | 2000:200:1 | 100 | 15 000 | 1.47 |
| 2 | 2000:100:1 | 100 | 19 000 | 1.51 |
| 3 | 2000:50:1 | 100 | 23 400 | 1.50 |
| 4 | 2000:20:1 | 100 | 34 500 | 1.61 | in which CTA = vinyltrimethoxysilane and [X]$_0$ = initial concentration of X
[a]the polymerization was performed under the following particular conditions: 5 μmol of catalyst (G2), 7 mL of CH$_2$Cl$_2$, temperature of 40° C., time 10 minutes
[b]the Mn$_{SEC}$ values were determined by SEC in THF at 30° C.

NMR analyses of the polymer obtained in test No. 2 gave the following values, which confirmed the structural formula of the polymer:

$^1$H NMR (CDCl$_3$, 400 MHz, 298 K)—δ$_{ppm}$: 5.38; 1.97, 1.29; end groups: 2.17 (m, 4H, —CH$_2$—CH=CH$_2$), 3.57 (s, 9H, —(CH$_3$O—Si), 4.92-5.01 (m, 2H, CH$_2$=CH—CH$_2$—), 5.80-5.82 (m, 1H, CH$_2$=CH—CH$_2$—), 6.41-6.48 (m, 1H, —CH=CH—Si).

$^{13}$C NMR ($^1$H) (CDCl$_3$, 100 MHz, 298 K)—δ$_{ppm}$: 130.1 (trans) 129.9 (cis), 33.7, 32.6, 29.1, 28.2, 27.2); end groups: 154.8 (—CH=CH—Si), 139.1 (—CH=CH$_2$), 117.1 (—CH=CH—Si), 114.1 (CH$_2$=CH—), 50.5 ((CH$_3$O)$_3$Si).

Example 2: Synthesis of a Polymer Comprising an Alkoxysilane End Group Starting With Cyclooctene (COE) and Allyltrimethoxysilane The reaction was performed according to the general reaction scheme No. 1 given previously, with Y=—CH$_2$—Si(OCH$_3$)$_3$.

The expected polymer was synthesized. It had a melting point of 54° C.

Various tests were performed according to this reaction. They are collated in Table 2 below.

TABLE 2

| Test No.[a] | [COE]$_0$/[CTA]$_0$/[Ru]$_0$ (mol/mol) | Conversion (%) | Mn$_{SEC}$[b] (g/mol) | PDI |
|---|---|---|---|---|
| 5 | 2000:200:1 | 100 | 8500 | 1.28 |
| 6 | 2000:100:1 | 100 | 9700 | 1.32 |
| 7 | 2000:50:1 | 100 | 20 000 | 1.44 |
| 8 | 2000:20:1 | 100 | 33 800 | 1.55 | in which CTA = allyltrimethoxysilane and [X]$_0$ = initial concentration of X
[a]the polymerization was performed under the following particular conditions: 5 μmol of catalyst (G2), 7 mL of CH$_2$Cl$_2$, temperature of 40° C., time 5 minutes
[b]the Mn$_{SEC}$ values were determined by SEC in THF at 30° C.

NMR analyses of the polymer obtained in test No. 6 gave the following values, which confirmed the structural formula of the polymer:

$^1$H NMR (CDCl$_3$, 400 MHz, 298 K)—δ$_{ppm}$: 5.37; 1.96, 1.27; end groups: 1.57 (m, 2H, —CH$_2$—Si), 3.57 (s, 9H, —(CH$_3$O—Si), 4.91-5.01 (m, 2H, CH$_2$=CH—CH$_2$—), 5.34-5.37 (m, 2H, —CH=CH—CH$_2$—Si), 5.79-5.84 (m, 1H, CH$_2$=CH—CH$_2$—).

$^{13}$C NMR ($^1$H) (CDCl$_3$, 100 MHz, 298 K)—δ$_{ppm}$: 130.3 (trans) 129.9 (cis), 33.8, 32.6, 29.6, 29.1, 28.2, 27.2; end groups: 139.2 (—CH=CH$_2$), 129.9 (—CH=CH—CH$_2$—Si), 122.6 (—CH=CH—CH$_2$—Si), 114.1 (CH$_2$=CH—), 50.7 ((CH$_3$O)$_3$Si).

Example 3: Synthesis of a Polymer Comprising an Alkoxysilane End Group Starting With Cyclooctene (COE) and 3-(trimethoxysilyl)propyl Acrylate The reaction was performed according to the general reaction scheme No. 1 given previously, with Y=—CO—O—(CH$_2$)$_3$Si(OCH$_3$)$_3$).

The expected polymer was synthesized. It had a melting point of 59° C.

Various tests were performed according to this reaction. They are collated in Table 3 below.

TABLE 3

| Test No.[a] | [COE]$_0$/[CTA]$_0$/[Ru]$_0$ (mol/mol) | Conversion (%) | Mn$_{SEC}$[b] (g/mol) | PDI |
|---|---|---|---|---|
| 9 | 2000:200:1 | 100 | 11 300 | 1.82 |
| 10 | 2000:100:1 | 100 | 14 700 | 1.53 |
| 11 | 2000:50:1 | 100 | 26 300 | 1.47 |
| 12 | 2000:20:1 | 100 | 36 000 | 1.55 | in which CTA = 3-(trimethoxysilyl)propyl acrylate and [X]$_0$ = initial concentration of X
[a]the polymerization was performed under the following particular conditions: 5 μmol of catalyst (G2), 7 mL of CH$_2$Cl$_2$, temperature of 40° C., time 5 minutes
[b]the Mn$_{SEC}$ values were determined by SEC in THF at 30° C.

NMR analyses of the polymer obtained in test No. 10 gave the following values, which confirmed the structural formula of the polymer:

$^1$H NMR (CDCl$_3$, 400 MHz, 298 K)—δ$_{ppm}$: 5.36; 1.97, 1.30; end groups: 0.67 (t, 2H, —CH$_2$—Si), 1.76 (t, 2H, —CH$_2$—CH—Si), 3.58 (s, 9H, CH$_3$O—Si), 4.09 (t, 2H, —CH$_2$—CH$_2$—CH$_2$—Si), 4.94 (m, 2H, CH$_2$=CH—CH$_2$—), 5.38 (m, 1H, CH$_2$=CH—CH$_2$—), 5.79-5.84 (m, 1H, CH$_2$=CH—CO$_2$—), 6.94 (1H, CH$_2$=CH—CO$_2$—).

$^{13}$C NMR ($^1$H) (CDCl$_3$, 100 MHz, 298 K)—δ$_{ppm}$: 130.3 (trans) 129.9 (cis), 33.8, 32.6, 29.6, 29.1, 27.2; end groups: 166.7 (—CO$_2$—CH$_2$), 149.4 (—CH=CH—CO$_2$—), 139.1 (—CH=CH$_2$), 121.21 (—CH=CH—CO$_2$—), 114.1 (CH$_2$=CH—), 66.1 (—CO$_2$—CH$_2$—), 50.6 ((CH$_3$O)$_3$Si), 22.0 (—CH$_2$—CH$_2$—Cl$_2$—), 5.20 (—CH$_2$—CH$_2$—CH$_2$—).

Example 4: Synthesis of a Polymer Comprising an Alkoxysilane End Group Starting with 3-hexylcyclooctene (3-H—COE) and 3-(trimethoxysilyl)propyl Acrylate The reaction was performed according to the general reaction scheme No. 2 given below.

Scheme No. 2

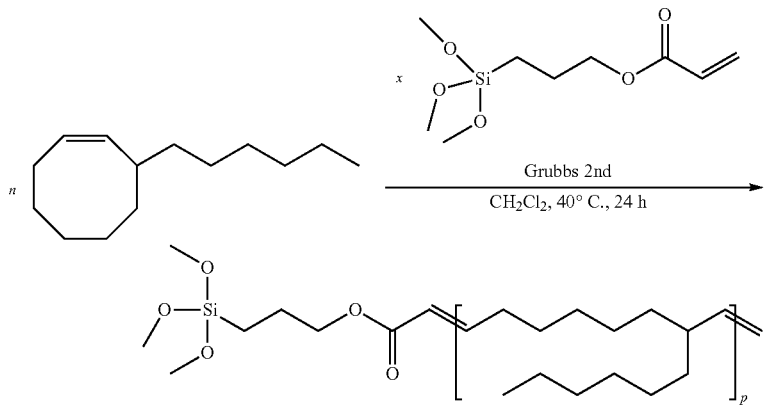

The expected polymer was synthesized.

A single test was performed according to this reaction. It is collated in Table 4 below.

TABLE 4

| [3-H-COE]$_o$/[CTA]$_o$/[Ru]$_o$ (mol/mol) | Conversion (%) | Mn$_{SEC}$[b] (g/mol) | PDI |
|---|---|---|---|
| 2 000:100:1 | 100 | 4 300 | 1.56 | in which CTA = 3-(trimethoxysilyl)propyl acrylate and [X]$_0$ = initial concentration of X
[a] the polymerization was performed under the following particular conditions: catalyst (G2), 7 mL of CH$_2$Cl$_2$, temperature of 40° C., time 24 hours
[b] the Mn$_{SEC}$ values were determined by SEC in THF at 30° C.

NMR analyses of the polymer obtained gave the following values, which confirmed the structural formula of the polymer:

$^1$H NMR (CDCl$_3$, 400 MHz, 298 K)—$\delta_{ppm}$: 5.33; 5.10; 1.96, 1.29; end groups: 6.93 (m, 2H, —CH=CH—CO$_2$—), 5.83 (m, 2H, —CH=CH—CO$_2$—), 5.50 (m, CH$_2$=CH—), 5.04 (m, CH$_2$=CH—), 4.08 (t, —O—CH$_2$—CH$_2$—CH$_2$—Si6), 3.58 (s, CH$_3$—O—Si—), 1.84 (m, —CH(CH$_2$)$_5$ and —O—CH$_2$—CH$_2$—CH$_2$—Si—), 0.86 (t, —(CH$_2$)$_5$—CH$_3$), 0.67 (m, —O—CH$_2$—CH$_2$—CH$_2$—Si—).

$^{13}$C NMR ($^1$H) (CDCl$_3$, 100 MHz, 298 K)—$\delta_{ppm}$: 134.8, 134.1, 129.0, 128.0, 35.9, 34.6-34.1, 31.0, 28.3-21.7; end groups: 165.6 (—O—CO—CH—), 148.3 (—CH=CH—CO—), 142.5 (—CH=CH—CO—), 120.1 (CH$_2$=CH—), 112.8 (CH$_2$=CH—), 65.0 (—Si—CH$_2$—CH$_2$—CH$_2$—O—CO—), 49.6 (CH$_3$—O—Si—), 41.9 (—CHCH=CH$_2$—), 31.6 (—CH—CH$_2$—), 13.1 (CH$_3$—(CH$_2$)$_5$—), 4.4 (—Si—CH$_2$—CH$_2$—CH$_2$—O—).

The invention claimed is:

1. A hydrocarbon-based polymer bearing an alkoxysilane end group, said hydrocarbon-based polymer being of formula (1'):

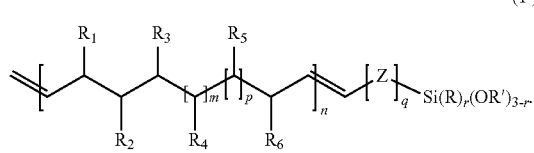

(1')

in which:
the groups R$_1$, R$_2$, R$_3$, R$_4$, R$_5$ and R$_6$ are each, independently of each other, a hydrogen, a halo group, an alkoxycarbonyl group or an alkyl group, the groups R$_1$ to R$_6$ possibly being linked together as members of the same ring or heterocycle comprising at least one carbon-carbon double bond,
m and p are integers each within a range from 0 to 5, the sum m+p being within a range from 0 to 10,
R and R', which may be identical or different, each represent a linear or branched, alkyl group comprising from 1 to 4 carbon atoms,
Z is a divalent group chosen from alkylene groups interrupted with an ester function, and comprising from 1 to 22 carbon atoms,
q is an integer equal to 1,
r is an integer equal to 0, 1 or 2, and
n is an integer such that the number-average molar mass Mn of the hydrocarbon-based polymer of formula (1') is within a range from 400 to 50,000 g/mol, and the polydispersity index (PDI) of the hydrocarbon-based polymer of formula (1') is within a range from 1.0 to 2.0.

2. The hydrocarbon-based polymer bearing an alkoxysilane end group as claimed in claim 1, such that the group of formula —[Z]$_q$—Si(R)$_r$(OR')$_{3-r}$ is —CO—O—(CH$_2$)$_3$Si(OCH$_3$)$_3$); or —CO—O—(CH$_2$)$_3$SiCH$_3$(OCH$_3$)$_2$).

3. The hydrocarbon-based polymer bearing an alkoxysilane end group as claimed in claim 1, said hydrocarbon-based polymer being of formula (2):

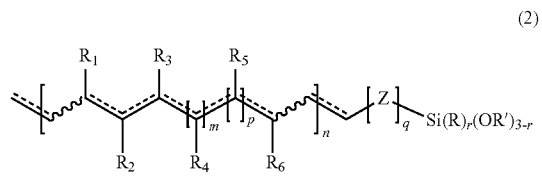

(2)

wherein each carbon-carbon bond of the chain noted as ⌇ is a single bond and the bond ⌇ means that the bond is geometrically oriented on one side or the other relative to the double bond, cis (Z) or trans (E).

4. The hydrocarbon-based polymer bearing an alkoxysilane end group as claimed in claim 3, wherein each of R$_1$, R$_2$, R$_3$, R$_4$, R$_5$ and R$_6$ are hydrogen.

5. The hydrocarbon-based polymer bearing an alkoxysilane end group as claimed in claim 1, wherein each of $R_1$, $R_2$, $R_3$, $R_4$, $R_5$ and $R_6$ are hydrogen.

6. A process for preparing at least one hydrocarbon-based polymer as claimed in claim 1, said process comprising at least one ring-opening metathesis polymerization in the presence of:
- at least one metathesis catalyst,
- at least one chain-transfer agent (CTA) chosen from the group formed by alkenylsilanes bearing a monosubstituted carbon-carbon double bond, and
- at least one compound chosen from compounds comprising at least one hydrocarbon-based ring, said ring comprising at least one carbon-carbon double bond, and substituted derivatives of this compound, said compound being of formula (7):

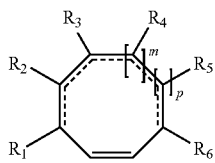
(7)

in which:
each carbon-carbon bond of the chain noted as is a double bond or a single bond, in accordance with the valency rules of organic chemistry;
the groups $R_1$, $R_2$, $R_3$, $R_4$, $R_5$ and $R_6$ are each, independently of the other groups or otherwise, a hydrogen, a halo group, an alkoxycarbonyl group or an alkyl group, the groups $R_1$ to $R_6$ possibly being linked together as members of the same saturated or unsaturated ring or heterocycle,
m and p are integers each within a range from 0 to 5, the sum m+p itself being within a range from 0 to 10,
said polymerization being performed for a time of less than 2 hours, when $R_1$ and $R_6$ are both equal to H; and
said polymerization being performed for a time of less than or equal to 30 hours when at least one from among $R_1$ and $R_6$ is not H.

7. The preparation process as claimed in claim 6, such that the chain-transfer agent has the formula $CH_2=CH-[Z]_q-Si(R)_r(OR')_{3-r}$ in which:
R and R', which may be identical or different, each represent a linear or branched alkyl group comprising from 1 to 4 carbon atoms,
Z is a divalent alkylene group interrupted with an ester function, and comprising from 1 to 22 carbon atoms,
q is an integer equal to 1, and
r is an integer equal to 0, 1 or 2.

8. The preparation process as claimed in claim 6, such that the chain-transfer agent is: $CH_2=CH-CO-O-(CH_2)_3Si(OCH_3)_3$; or $CH_2=CH-CO-O-(CH_2)_3SiCH_3(OCH_3)_2$.

9. The preparation process as claimed in claim 6, said process being such that the mole ratio of the CTA to the compound comprising at least one hydrocarbon-based ring is within a range from 1 to 10 mol %.

10. The preparation process as claimed in claim 6, said process also comprising at least one additional hydrogenation of double bonds.

11. The preparation process as claimed in claim 10, such that the additional hydrogenation is performed by catalytic hydrogenation, under hydrogen pressure and in the presence of a hydrogenation catalyst.

12. In an adhesion promoter comprising a hydrocarbon-based polymer, the improvement wherein the hydrocarbon-based polymer is one according to claim 1.

13. In an adhesive composition comprising a reactive plasticizer, the improvement wherein the reactive plasticizer is a hydrocarbon-based polymer according to claim 1.

* * * * *